…

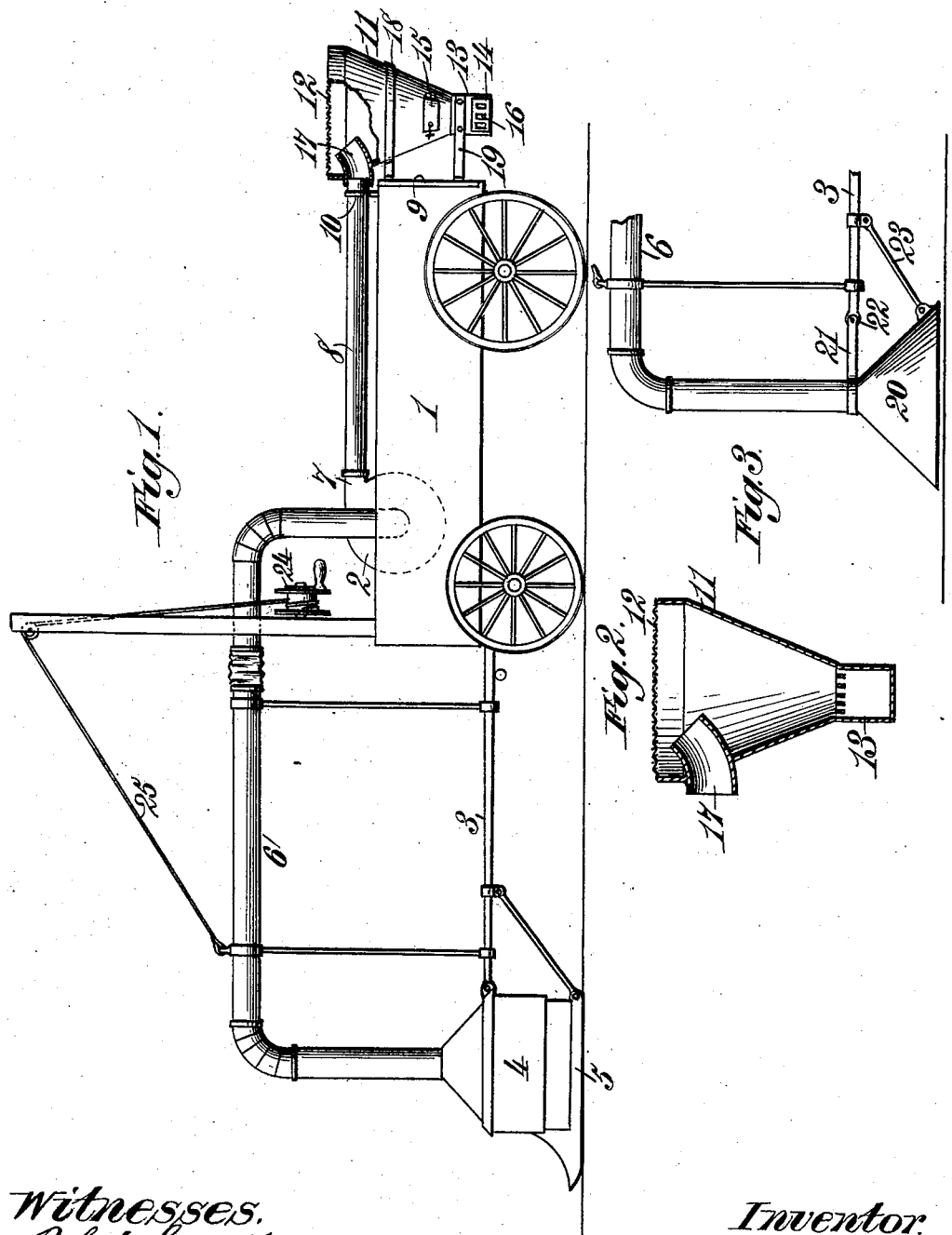

UNITED STATES PATENT OFFICE.

FRANK M. DANNELLY, OF DALLAS, TEXAS.

MACHINE FOR DESTROYING COTTON-BOLL WEEVIL, &c.

SPECIFICATION forming part of Letters Patent No. 685,112, dated October 22, 1901.

Application filed April 13, 1901. Serial No. 55,724. (No model.)

*To all whom it may concern:*

Be it known that I, FRANK M. DANNELLY, a citizen of the United States, residing at Dallas, in the county of Dallas and State of Texas, have invented new and useful Improvements in Machines for Destroying Cotton-Boll Weevil and other Destructive Insects, of which the following is a specification.

This invention relates to machines for destroying cotton-boll weevil and other destructive insects and for collecting infected dead portions of the cotton-plants which contain the eggs of insects and subjecting them to the destructive action of fire; and it has for its object to provide a simple and inexpensive machine of the character described by means of which the insects and the dead portions of the plants, with the eggs of the insects adhering thereto, may be drawn up by suction from the plants and ground and discharged into a furnace, where the insects and infected parts of the plant will be consumed or destroyed.

To this end my invention consists in the features and in the construction, combination, and arrangement of parts hereinafter described, and particularly pointed out in the claims following the description, reference being had to the accompanying drawings, forming a part of this specification, wherein—
Figure 1 is a view in side elevation of my improved machine. Fig. 2 is a vertical sectional view of the furnace, and Fig. 3 is a detail view showing a modified form of suction-chamber.
The present invention is designed for use in connection with the improved suction cotton-harvesting machine for which I made application for Letters Patent of the United States on the 24th day of January, 1901, said application being serially numbered 44,625. In the application referred to I show a wagon having mounted thereon an exhaust-fan, with a discharge-pipe leading to a cotton-cleaning receptacle, and a suction-chamber suspended from the forward end of the wagon-tongue and arranged to straddle a row of cotton-plants, and a suction-pipe leading from the suction-chamber to the inlet end of the exhaust-fan, the arrangement being such that the cotton is drawn up by suction through the suction-chamber and pipe into the fan and is discharged by the latter into the cleaning-receptacle. In the present invention the same parts, excepting the cleaning-receptacle, are employed, and the discharge-pipe is arranged to discharge into a furnace, where the insects and infected portions of the plants which are drawn up by suction and discharged into the furnace are destroyed.

Referring to the drawings, the numeral 1 indicates an ordinary farm-wagon or other suitable wheeled carriage or conveyance carrying an exhaust-fan 2, which may be operated by any preferred or convenient power or motor. From the forward end of the tongue 3 of the wagon is suspended a suction-chamber 4, which is arranged to straddle a row of growing cotton-plants and is supported by runners 5, which run along the ground on each side of the plants. A suction-pipe 6 leads from the top of the suction-chamber to the inlet end of the fan and operates to deliver the material collected by the suction-chamber to the fan. All the parts are constructed and arranged in the manner fully shown and described in my said application for patent, and need not, therefore, be herein described in detail.

Connected to the discharge or outlet 7 of the fan 2 is a discharge-pipe 8, the rear end of which terminates at a point above or slightly in rear of the tail-board 9 of the wagon 1 and at its rear end is rigidly held in place by a brace 10, which is secured to one or both sides of the body of the wagon.

To the tail-board 9 is attached a furnace comprising an inverted frusto-conical or funnel shaped vessel 11, covered at its upper end with a screen or wire-netting 12 and connected at its lower end with a fire-box 13, which may conveniently consist of a cylindrical casing closed at its bottom and opening at its top into the lower contracted end of the conical casing 11. The fire-box is provided in its lower portion with a door 14, through which the ashes may be removed, and the lower end of the conical vessel 11 is provided with a door 15, through which fuel may be fed to the fire-box. The door 14 is provided with a damper 16, of ordinary construction, to control the admission of air to the fire-box. In the upper part of the vessel 11, which constitutes a hopper, is disposed a discharge-spout 17, which is in the form of an upturned elbow fitted at its lower end in an aperture formed in the front side of the hopper and directed at its upper end toward the wire screen 12. The spout 17 is of such size that the rear end of the discharge-pipe 8 will readily fit in the lower end of the spout. The furnace is rigidly secured to the tail-board 9 of the wagon by braces 18 and 19, which may conveniently consist of metallic straps, the brace 18 being passed around the hopper and riveted thereto and bolted, screwed, or otherwise suitably fastened at its ends to the tail-board 9. The brace 19 is in similar manner attached to the fire-box 13 and the tail-board.

In Fig. 3 of the drawings I have illustrated a modified form of suction-chamber consisting of an inverted-funnel-shaped sheet-metal casing 20, which may be substituted for the suction-chamber shown in Fig. 1. The suction-chamber 20 is connected to the end of the wagon-tongue 3 by a brace 21, which is fastened at its forward end to the upper end or neck of the suction-chamber and at its rear end is pivoted, as at 22, to the forward end of the wagon-tongue. The suction-chamber is also supported in position by a brace 23, pivoted at one end to the lower end of the suction-chamber and at its other end to the wagon-tongue. By suspending the suction-chamber 20 in the manner described it is held sufficiently ahead of the horses to prevent their feet from striking its lower end, and by means of the windlass 24 and cable 25 (which are fully described in my said former application for patent and need not, therefore, be described in detail herein) the suction-chamber may be adjusted to the desired height above the ground. By substituting the funnel-shaped suction-chamber 20 for that shown in Fig. 1 the apparatus is adapted for use in fields where grain is growing that has been sown broadcast—such as wheat, barley, rye, oats, and the like—for the purpose of collecting grasshoppers, locusts, and other insects that infest grain and discharging such insects into the furnace, where they are consumed.

The operation of my improved machine will be readily understood from the foregoing description.

The machine is designed to be used while the plants are growing and fruiting and before the cotton ripens and opens. In practice the brushes shown and described in my former application for patent before referred to are removed from the suction-chamber, so as to permit all dead portions of the plants and trash to be drawn up from the ground, and a hot fire is built in the furnace with charcoal or other suitable fuel. As the machine is drawn along and over a row of plants the suction exerted by the fan will readily draw up the infected dead portions of the plants from the ground and all insects and the like from the growing plants and discharge them through the discharge-pipe 8 into the furnace. As the insects and infected portions of the plants enter the hopper they are deflected or discharged against the under side of the wire-netting 12, by which they are temporarily held, the air escaping freely through the screen without interfering with the draft of the fire. The insects and dead portions of plants after they strike the screen are incinerated by the heat and drop from the screen down through the heating-chamber into the fire, where they are thoroughly consumed.

The operation is substantially the same when the funnel-shaped suction-chamber 20 is substituted for the chamber 4, the insects and infected trash being drawn up into the chamber 20 and discharged into the furnace in the manner before described.

Having described my invention, what I claim is—

1. In a machine of the class described, the combination with a wagon and a suction-chamber movable therewith and arranged to travel in proximity to the ground, of an exhaust-fan carried by the wagon, a suction-pipe leading from the suction-chamber to the fan, a discharge-pipe leading from the fan, and a furnace connected to the discharge end of the discharge-pipe, substantially as described.

2. In a machine of the class described, the combination with a wagon and a suction-chamber movable therewith and arranged to travel in proximity to the ground, of an exhaust-fan carried by the wagon, a suction-pipe leading from the suction-chamber to the fan, a discharge-pipe leading from the fan, and a furnace connected to the discharge end of the discharge-pipe, said furnace being open at its upper end and covered with a screen, substantially as described.

3. In a machine of the class described, the combination with a wagon and a suction-chamber movable therewith and arranged to travel in proximity to the ground, of an exhaust-fan carried by the wagon, a suction-pipe leading from the suction-chamber to the fan, a discharge-pipe leading from the fan, a furnace open at its upper end and having a screen cover, and a spout arranged in said furnace and connected with the discharge end of the discharge-pipe, said spout being arranged to discharge against the under side of said screen, substantially as described.

4. In a machine of the class described, the combination with a wagon and a suction-chamber movable therewith and arranged to travel in proximity to the ground, of an exhaust-fan carried by the wagon, a suction-pipe leading from the suction-chamber to the fan, a furnace comprising a hopper open at its upper end and provided with a screen cover, a fire-box at the lower end of the hopper, a pipe leading from the discharge-outlet of the fan to the furnace, and means for directing the discharge from said pipe against the under side of the screen, substantially as described.

5. In a machine of the class described, the combination with a wagon and a suction-chamber movable therewith and arranged to travel in proximity to the ground, of an exhaust-fan carried by the wagon, a suction-pipe leading from the suction-chamber to the fan, a furnace comprising a funnel-shaped hopper open at its upper end and provided with a screen cover, a fire-box at the lower end of the hopper, a pipe leading from the discharge-outlet of the fan to the furnace, and means for directing the discharge from said pipe against the under side of the screen, substantially as described.

6. In a machine of the class described, the combination with a wagon, of a furnace attached to said wagon having an open upper end covered by a screen, an exhaust-fan carried by the wagon, a suction-chamber movable with the wagon and arranged to straddle a row of growing plants, a suction-pipe leading from the suction-chamber to the fan, a pipe leading from the outlet of the fan to the furnace, and a spout arranged in the upper part of the furnace and communicating with the exterior of the latter, said spout being arranged to telescope with the rear end of the pipe leading from the fan, substantially as described.

In testimony whereof I have hereunto set my hand in presence of two subscribing witnesses.

FRANK M. DANNELLY.

Witnesses:
R. H. HARRISON,
R. A. WOOD.